United States Patent
Gerez et al.

(10) Patent No.: US 7,427,186 B2
(45) Date of Patent: Sep. 23, 2008

(54) ROTARY ENGINE WITH SHAFT BEARING HAVING TWO STIFFNESSES, ROTARY ENGINE SHAFT AND MEANS OF CONNECTION BETWEEN A ROTARY ENGINE SHAFT AND A BEARING

(75) Inventors: Valerio Gerez, Yerres (FR); Edouard Joseph Jadczak, Le Mee sur Seine (FR); Florian Poinsot-Berthelot, Paris (FR)

(73) Assignee: SNECMA, Paris (FR)

( * ) Notice: Subject to any disclaimer, the term of this patent is extended or adjusted under 35 U.S.C. 154(b) by 524 days.

(21) Appl. No.: 11/260,207

(22) Filed: Oct. 28, 2005

(65) Prior Publication Data

US 2006/0097589 A1    May 11, 2006

(30) Foreign Application Priority Data

Oct. 28, 2004 (FR) .................................. 04 52479

(51) Int. Cl.
  F01D 25/04 (2006.01)
  F03B 11/04 (2006.01)
(52) U.S. Cl. ...................................... 415/113; 415/119
(58) Field of Classification Search ................. 415/112, 415/113, 119, 229; 416/174, 500; 384/99, 384/535, 581
See application file for complete search history.

(56) References Cited

U.S. PATENT DOCUMENTS

| 4,884,903 A | 12/1989 | Pham et al. |
| 4,983,051 A | 1/1991 | Hibner et al. |
| 5,088,840 A * | 2/1992 | Radtke ........................ 384/535 |
| 5,797,684 A | 8/1998 | Becker |
| 2004/0047731 A1* | 3/2004 | Hull ............................... 416/1 |

FOREIGN PATENT DOCUMENTS

| DE | 102 58 528 A1 | 7/2004 |
| FR | 2 629 537 | 10/1989 |
| FR | 2 631 381 | 11/1989 |
| FR | 2 753 244 | 3/1998 |
| GB | 22256 | 0/1914 |

* cited by examiner

*Primary Examiner*—Edward Look
*Assistant Examiner*—Aaron R Eastman
(74) *Attorney, Agent, or Firm*—Oblon, Spivak, McClelland, Maier & Neustadt, P.C.

(57) ABSTRACT

A shaft mounted to rotate with respect to another fixed or rotary element of a rotary engine to which the shaft is connected by at least one bearing, it being possible for the engine to operate in at least two different operating speeds, the shaft comprising a connection to the bearing that has a state of stiffness that varies with engine operating speed. The connection comprises a squirrel cage comprising at least two points of attachment, one to the bearing and one to the shaft, between which points there extends a flexible portion, the shaft comprises an actuator able to adopt at least two positions for controlling the state of stiffness of the squirrel cage, the actuator comprises a piston designed to be displaced by oil pressure in a chamber formed between the piston and shaft from a rigid state of stiffness position to a soft state of stiffness position.

12 Claims, 3 Drawing Sheets

ROTARY ENGINE WITH SHAFT BEARING HAVING TWO STIFFNESSES, ROTARY ENGINE SHAFT AND MEANS OF CONNECTION BETWEEN A ROTARY ENGINE SHAFT AND A BEARING

The invention relates to the field of rotary engines, particularly gas turbine engines.

A gas turbine engine comprises various rotary functional elements supported by shafts. These shafts are supported by bearings which may in particular be rolling bearings, oil bearings or gas bearings. The life of the bearings and of the structure of the engine is to a large extent dictated by the vibrational characteristics of the engine as a whole: its frame, the shafts, their bearings and their supports in particular.

The greater the amplitude of the vibrational response, at a given frequency, of each of the parts of the engine as a whole, the greater the stresses applied to the bearings and the elements of the structure by the loads to which they are subjected and the shorter their life. The sources of vibrational excitation stem to a large extent from the mechanical imbalance of the shafts, something which is inevitable as a result of manufacturing tolerances. The main vibrational frequencies experienced by the engine as a whole are close to the rotational frequency of the engine. The issue is therefore one of engineering the engine as a whole in such a way that its elements do not exhibit a strong vibrational response to excitation irrespective of the speed of the engine.

The patent application filed by the Applicant on Dec. 1, 2004 under the number FR 04 00 220, proposes to provide a bearing support comprising two load-bearing mechanical structures of different stiffnesses, combined to support the bearing with one or other of these stiffnesses, depending on the speed of the engine. Thus, the stiffness of the bearing support can be tuned to the speed of the engine, so that the vibrational response of the whole is never in a region close to that of the resonant frequency.

This double structure is, however, cumbersome to fit. What is more, it cannot be applied to the inter-shaft bearings, that is to say to the bearings positioned between two concentric shafts, because they are not fixed to a bearing support connecting them to the fixed structure of the engine. This, for example, is the case with the inter-shaft fourth bearing situated between the downstream journal of the high-pressure turbine shaft and the low-pressure turbine shaft, whether these shafts are co-rotary or contra-rotary, in a twin spool turbine engine. Now, in this area, the imbalance in the high-pressure rotor, which comprises the high-pressure turbine, the high-pressure compressor and the high-pressure shaft, generates heavy loads on the inter-shaft bearing and reduces its life, and may even cause the bearing to fail.

The invention is aimed at proposing a device that allows the vibrational response of a bearing to be tuned to the speed of the engine, and which is universal.

To this end, the invention relates to a rotary engine comprising at least one shaft mounted to rotate with respect to another element of the engine, fixed or rotary, to which it is connected by at least one bearing, it being possible for the engine to operate in at least two different operating speeds, the shaft comprising means of connection to the bearing that have a state of stiffness that can vary with the engine operating speed, characterized in that the connecting means comprise a squirrel cage comprising at least two points of attachment, on the one hand to the bearing and, on the other hand, to the shaft, between which points there extends a portion that is flexible in bending, the shaft comprises an actuator able to adopt at least two positions for controlling the state of stiffness of the squirrel cage, the actuator comprises a piston designed to be displaced, against the action of return means, by a pressure of oil in a chamber formed between the piston and the shaft from a rigid state of stiffness position to a soft state of stiffness position, and vice versa.

The term "point of attachment" is to be understood as meaning a region of the cage, secured to the element to which it is "attached". In the engine of the invention, the connecting means the stiffness of which can vary are situated directly between the shaft and the bearing. They may therefore be arranged at an inter-shaft bearing or on a shaft supported by a bearing fixed to the fixed structure by a bearing support, without their being any need to provide a second bearing support.

As a preference, the stiffness of the connecting means varies automatically with the engine speed.

Advantageously, the actuator can adopt a first position, out of contact with the squirrel cage, in which position the squirrel cage is in a soft state of stiffness, and a second position, in abutment between a wall of the shaft and a wall of the squirrel cage, in which position the squirrel cage is in a rigid state of stiffness.

The invention applies particularly to a bearing situated between the high-pressure turbine shaft and the low-pressure turbine shaft of a twin spool turbine engine, but it goes without saying that the Applicant does not intend to limit the scope of its rights to such an application, the invention applying to any shaft supported by a bearing.

The invention also relates to a rotary engine shaft comprising means of connection to a bearing having a state of stiffness that can vary with the operating speed of the engine, characterized in that the connecting means comprise a squirrel cage comprising at least two points of attachment, on the one hand to the bearing and, on the other hand, to the shaft, between which points there extends a portion that is flexible in bending, the shaft comprises an actuator able to adopt at least two positions for controlling the state of stiffness of the squirrel cage, the actuator comprises a piston designed to be displaced, against the action of return means, by a pressure of oil in a chamber formed between the piston and the shaft from a rigid state of stiffness position to a soft state of stiffness position, and vice versa.

The invention further relates to means of connection between a shaft of a rotary engine and a bearing connected to the shaft, which have a state of stiffness that can vary with the operating speed of the engine, and which are characterized in that they comprise a squirrel cage comprising at least two points of attachment, intended to be attached on the one hand to the bearing and, on the other hand, to the shaft, between which points there extends a portion that is flexible in bending and an actuator able to adopt at least two positions for controlling the state of stiffness of the squirrel cage(s), the actuator comprising a piston designed to be displaced, against the action of return means, by a pressure of oil in a chamber formed between the piston and the shaft from a rigid state of stiffness position to a soft state of stiffness position, and vice versa.

The invention will be better understood with the aid of the following description of the preferred embodiment of the engine of the invention, with reference to the attached plates, in which.

Figure 1:
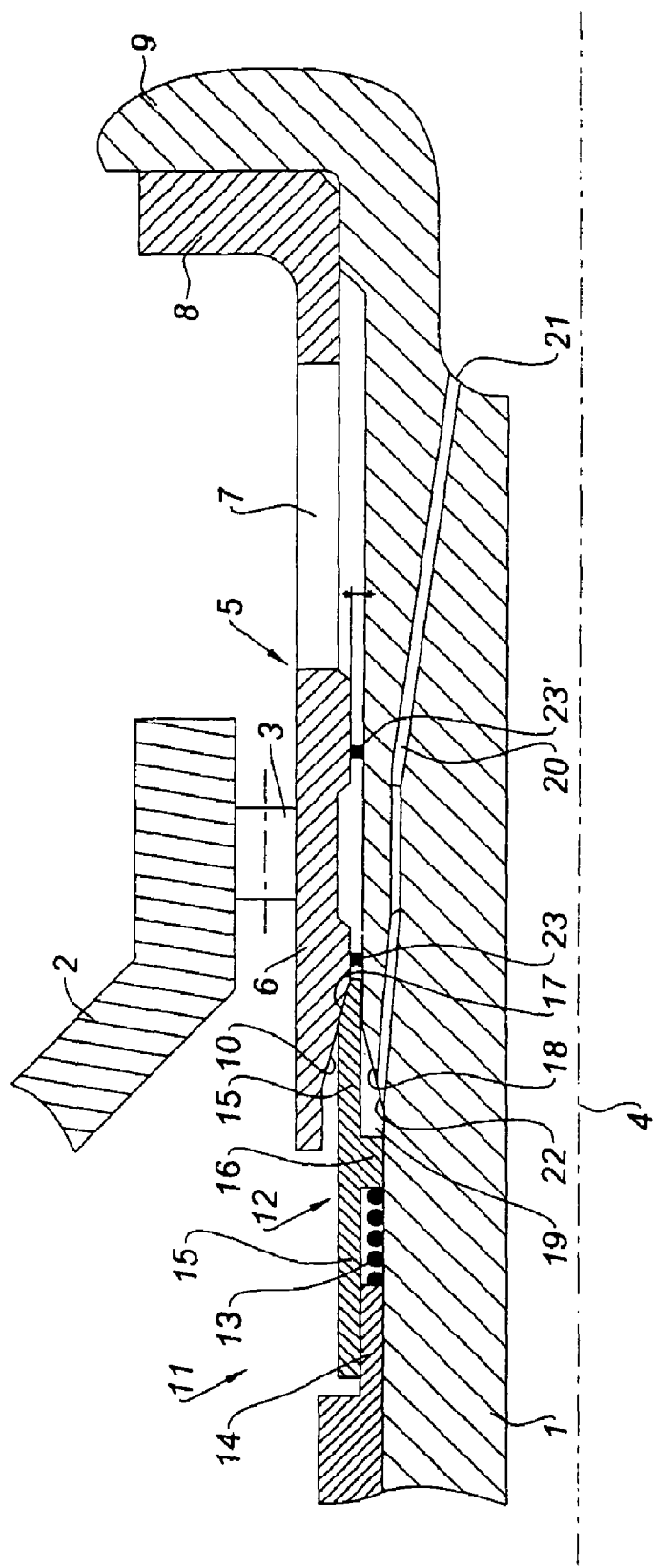
FIG. 1 depicts a schematic sectioned view of the bearing between the low-pressure turbine shaft and the high-pressure turbine shaft of the preferred embodiment of the turbine engine of the invention, with the squirrel cage in a first state of stiffness.

With reference to FIG. 1, the rotary engine of the invention, which in this instance is a twin spool turbine engine, comprises a low-pressure turbine shaft 1, hereafter termed the low-pressure shaft 1, mounted to rotate concentrically and, in this instance, inside, a high-pressure turbine shaft 2, hereafter termed the high-pressure shaft 2. This type of turbine engine is well known to those skilled in the art. The two shafts 1, 2 are connected, at the downstream end, or journal, of the high-pressure turbine shaft 1, by a bearing 3. The bearing 3 in this instance comprises an inner race and an outer race, between which rolling bodies, not depicted, are positioned.

The terms upstream, downstream, internal and external are to be understood as meaning upstream and downstream with respect to the direction in which the gases flow through the turbine engine, and internal and external with respect to the axis 4 of the turbine engine, which is the axis about which the shafts 1, 2 rotate.

A component 5 termed a squirrel cage 5 is mounted between the low-pressure shaft 1 and the bearing 3. In this instance, the squirrel cage 5 comprises a solid cylindrical portion 6, in its upstream part, downstream of which there extends a cylindrical portion with posts 7, flexible in bending, which at its downstream end comprises a radial flange 8. The solid cylindrical portion 6 is so termed because its wall is solid over its entire periphery; however, it is of course a hollow tubular component. The portion with posts 7 is the actual squirrel cage portion proper, which comprises longitudinal bars, or posts, separated by gaps. This portion with posts 7 gives the squirrel cage 5 a certain flexibility in bending, determined by the structure of the posts, their quantity and the nature of the material of which the cage 5 is made, which in this particular instance, is steel.

The solid cylindrical portion 6 of the squirrel cage 5 is fixed securely to the internal race of the bearing 3, at a point of attachment close to the middle of this portion 6. A point of attachment is to be understood as meaning a position on the longitudinal dimension of a component, not necessarily longitudinally restricted to a point, to which some other component can be attached, along its periphery. Attachment in fact covers securing, obtained by any means. The radial flange 8 for its part is fixed or attached securely to a radial flange 9 of the low-pressure shaft 1, in this instance by bolts, not depicted. The flange 8 represents a second point of attachment of the squirrel cage 5 to the low-pressure shaft 1. Between its two points of attachment there extends the portion with posts 7 of the squirrel cage 5, which is flexible in bending.

The internal upstream wall of the solid cylindrical portion 6 of the squirrel cage 5 has a chamfer 10 of mainly frustoconical shape, hereinafter termed the frustoconical bearing surface 10, or wall 10. In this instance, at the upstream end of the frustoconical bearing surface 10, the squirrel cage 5 comprises, running as far as its upstream end, a cylindrical portion.

The low-pressure shaft 1 comprises, upstream of the squirrel cage 5, an actuator 11. The actuator 11 comprises a piston 12, loaded by a spring 13 to bear against the downstream wall of a spacer piece 14 projecting radially from the external wall of the low-pressure shaft 1. The piston 12 comprises a longitudinal portion 15, an upstream portion of which is mounted to slide on the external wall of the spacer piece 14. This longitudinal portion 15 in this particular instance is preferably tubular. Approximately at the middle of its longitudinal portion 15, the piston 12 comprises a portion 16 projecting radially inwards, termed the radial portion 16, the radial dimension of which is equal to that of the spacer piece 14, which runs between the longitudinal portion 15 of the piston 12 and the external wall of the low-pressure shaft 1 downstream of the spacer piece 14. The spring 13 extends between the downstream wall of the spacer piece 14 and the upstream wall of the radial portion 16 of the piston 12 and forces the piston 12 in the downstream direction. The piston 12 is free only in translational movement along the low-pressure shaft 1.

The actuator 11 is to be understood here as being either a plurality of circumferentially distributed actuators or an annular actuator, but it will be described in cross section whatever its embodiment. It may comprise a single spring 13, a plurality of springs 13, or any elastic means, annular or distributed discreetly about the circumference of the shaft 1.

The longitudinal portion 15 of the piston 12 comprises, on the external wall of its downstream end, a frustoconical bearing surface 17, or wall 17, complementing the frustoconical bearing surface 10 of the squirrel cage 5, with which it can come into abutment, in a position that gives the squirrel cage 5 a state of stiffness termed the rigid state, which is the state of FIG. 1, under the stress of the spring 13. In this state, the downstream internal wall of the piston 12 rests against the raised external wall of the low-pressure shaft 1, which will be seen hereinafter.

The low-pressure shaft 1 comprises, downstream of the positions that the radial portion 16 of the piston 12 can adopt, a shoulder 18, in this instance of frustoconical shape, downstream of which there extends a raised external wall of the shaft 1, that is to say a wall whose distance to the axis 4 of the turbine engine is greater than that of the external wall of the shaft in contact with the radial portion 16 of the piston 12. This raised external wall is of cylindrical shape and lies at the same radial distance from axis 4 as the external wall of the spacer piece 14. The shoulder 18 forms, between the walls of the shaft 1 and the piston 12, a chamber 19.

The chamber 19 is supplied with oil by ducts 20, each duct running longitudinally and radially slightly outwards from a downstream inlet orifice 21 and opening via an upstream orifice 22 into the chamber 19. In this instance, these ducts 20 are also the ducts that supply the bearing 3 with oil, this supply being via orifices that have not been depicted.

If the oil pressure is high enough, in this instance if it is higher than the stress exerted by the spring 13, then the pressure in the chamber 19, via the radial portion 16, pushes the piston 12 upstream into a new position. This position gives the squirrel cage 5 a state of stiffness known as the soft state, in which the frustoconical bearing surfaces 10, 17 of the squirrel cage 5 and of the piston 12 are not in contact. In this state, the downstream end of the piston 12 still closes the chamber 19, by bearing against the raised external surface of the low-pressure shaft 1; the movement of the piston 12 is, to this effect, limited in the upstream direction by abutment of the upstream end of its longitudinal portion 15 against a shoulder 14' formed on the spacer piece 14.

Figure 2:
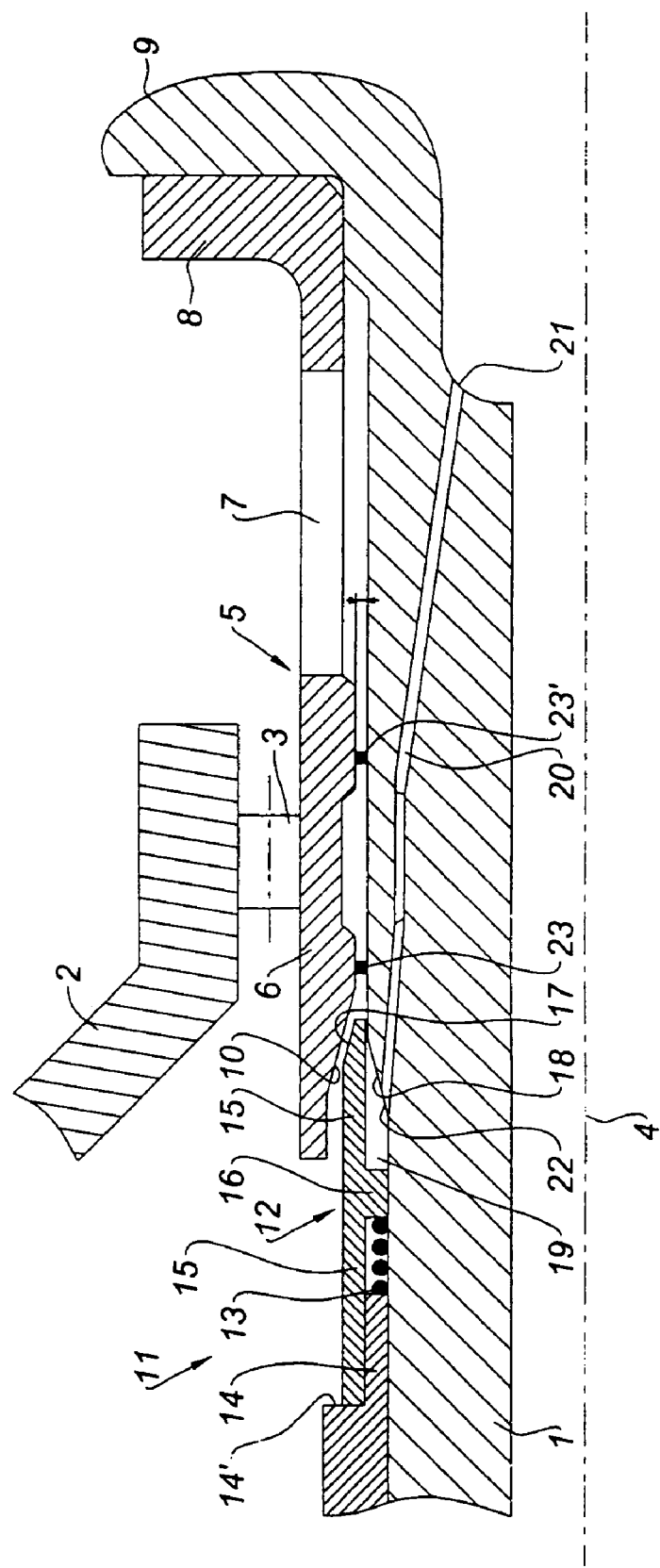
FIG. 2 depicts a schematic sectional view of the bearing between the low-pressure turbine shaft and the high-pressure turbine shaft of the preferred embodiment of the turbine engine of the invention, with the squirrel cage in a second state of stiffness.
Figure 3:
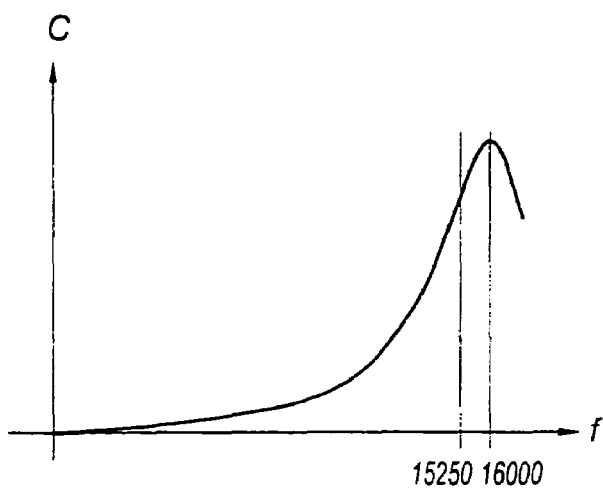
FIG. 3 depicts a frequency response diagram for the response of the bearing to vibrational excitation of the high-pressure turbine shaft of the turbine engine, in the state of stiffness of FIG. 1.
Figure 4:
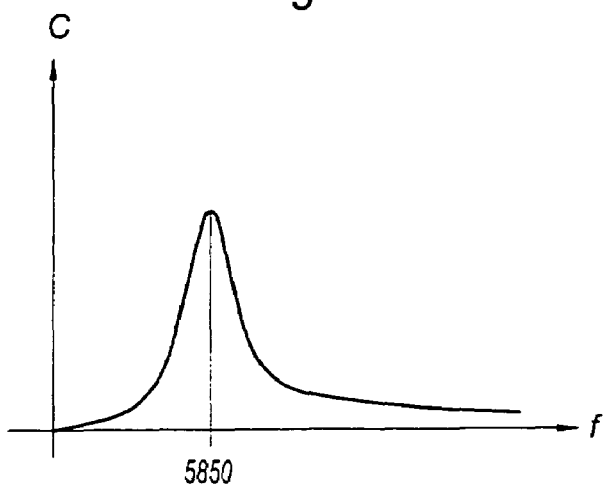
FIG. 4 depicts a frequency response diagram for the response of the bearing to vibrational excitation of the high-pressure turbine shaft of the turbine engine, in the state of stiffness of FIG. 2.

FIGS. 3 and 4 each depict a frequency response diagram of the vibrational response of the bearing 3 to excitation, under a load due, for example, to imbalance of the turbine engine rotor, in this instance a high-pressure rotor, which in particular comprises the high-pressure shaft 2, in the rigid state in FIG. 1 and in the soft state in FIG. 2, respectively. These diagrams therefore depict, on the ordinates axis, the dynamic load "c" borne by the bearing 3, as a function of the frequency "f" of rotation of the high-pressure shaft 2, plotted on the abscissa axis, in revolutions per minute. This frequency is termed the engine speed. Neither the units of the load "c" nor its values are of importance here, because the issue is one of observing the behaviour of the response, rather than the values it adopts, as a function of engine speed. The values of the load borne by the bearing are also, incidentally, dependent on the amplitude of the excitation.

The form of the response depends in particular on the design of the turbine engine, on the axial position of its bearings and on their separation, on the stiffness of the various elements that make up the engine as a whole, on their mass and on their structure. These diagrams here give an idea of the overall behaviour of the bearing of a turbine engine according to the invention with the squirrel cage 5 in a rigid state or in a soft state. The diagram set were determined experimentally and by calculation.

The diagram of FIG. 3 shows that, at low engine speed, the loads on the bearing 3, in response to excitation, with the squirrel cage 5 in the rigid state, are fairly low, increasing progressively with speed then increasing considerably above a certain speed and reaching a maximum, for a frequency known as the resonant frequency, in this instance considered to be equal to about 16 000 revolutions per minute.

In this rigid state, the piston 12 through a wedge effect immobilizes the low-pressure shaft 1 and the squirrel cage 5 one with respect to the other at the upstream part of the cage 5. These two elements are then separated by a clearance J1, completely filled by force by the piston 12, which causes the entity to behave as an integral component. The piston 12 is actually bearing, via its frustoconical bearing surface 17, against the frustoconical bearing surface 10 of the cage 5 via its internal wall against the raised external wall of the shaft 1, between which it exerts a wedging effect by the stressing of the spring 13 downstream.

The entity consisting of the low-pressure shaft 1, the piston 12, the squirrel cage 5 and the internal race of the bearing 3 is therefore rigid, and this explains why the diagram of FIG. 3 is entirely comparable with the diagrams obtained for bearings of the prior art, in which the internal race was secured directly to the shaft 1. FIG. 3 shows the value of engine speed, in this instance 15 250 revolutions per minute, currently required in operation as an engine speed threshold value; at the present time, engines are therefore engineered in such a way that the resonant frequency of the bearing response is above this required speed, so that the bearing response never falls within its region of maximum values.

The diagram of FIG. 4 shows that the loads on the bearing 3 in response to excitation with the squirrel cage 5 in the soft state exhibit a spike of resonance at low speed, in this instance at about 5850 revolutions per minute. The loads then decrease, becoming very low at high speed.

In this soft state, with reference to FIG. 2, the oil pressure in the chamber 19 is high enough to force the spring 13 in compression and push the piston 12 into abutment against the shoulder 14' of the spacer piece 14. The frustoconical bearing surface 17 of the piston 12 is therefore not in contact with the frustoconical bearing surface 10 of the squirrel cage 5 and the latter is therefore free to bend radially within the clearance space J1 with the raised external wall of the low-pressure shaft 1. The fact that this state is termed "soft" stems from this freedom that the squirrel cage 5 has to bend, because of the flexibility of its portion with posts 7. The radial clearance for bending may be designed to be smaller than J1, through contact between the frustoconical bearing surfaces 10, 17, in the event of excessive bending, should that prove necessary, by suitably engineering the clearance between the upstream wall of the piston 12 and the shoulder 14'.

In this soft state, the link between the bearing 3 and the low-pressure shaft 1 is therefore via a flexible element, since the internal race of the bearing 3 is secured to the solid cylindrical portion 6 of the squirrel cage 5 secured to the low-pressure shaft 1 via the portion with posts 7 and the flange 8 of the squirrel cage 5, the latter being fixed to the flange 9 of the low-pressure shaft 1. There is therefore a flexible lever arm between the flange 8 of the squirrel cage 5 and its point of attachment to the internal race of the bearing 3, because of the portion with posts 7.

The person skilled in the art was faced with the problem of there being a resonant frequency in the response of the bearing 3 at high speed. He may have attempted to overcome this by providing a bearing 3 connected to the low-pressure shaft 1 by a squirrel cage 5 constantly in its soft state. However, at low speed, in the event of imbalance in the high-pressure rotor, the flexibility of the squirrel cage 5 would generate a frequency response of the kind whereby the ends of the vanes of the high-pressure turbine would rub against their retaining casing and use up the clearances provided, using abradable material, well known to those skilled in the art, in this area.

It is therefore desirable to provide a device in which the response of the bearing 3 at low speed is that of the rigid state and in which the response at high speed is that of the soft state.

Figure 5:
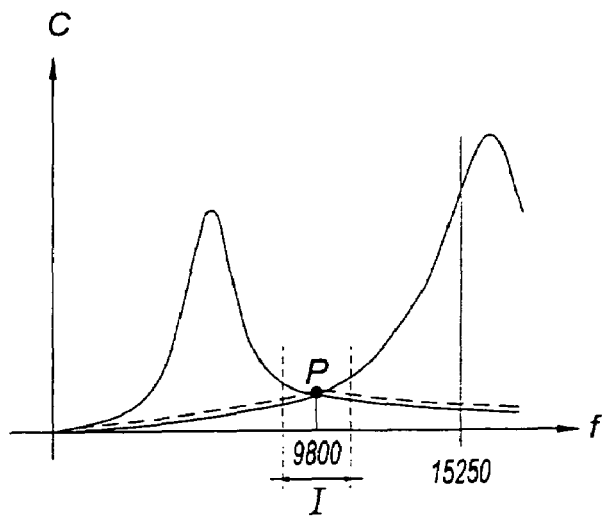
FIG. 5 is a frequency response diagram in which the diagrams of FIGS. 3 and 4 are superposed.

FIG. 5 shows a diagram in which the two previous diagrams have been superposed. The actuator 11 and the squirrel cage 5 are arranged in such a way that the response of the bearing 3 follows, at low speed, the curve of the rigid state and, at high speed, the curve of the soft state. These two curves intersect at a point P. The actuator 11 and the squirrel cage 5 are arranged so that the transition between the two states occurs automatically, near this point "P", in an inevitable area of uncertainty "I" of frequencies situated about this point "P". The actuator 11 and the squirrel cage 5 are sized in such a way that this area of uncertainty "I" is as small as possible, centred on the frequency of the point "P", in this instance at about 9800 revolutions per minute. Thus, the load taken by the bearing 3 is always that of the curve whose values are minimal, except possibly in the region "I" in which the difference in values between the two curves, for the same frequency, is small.

Several embodiments for obtaining this behaviour of the bearing 3 will now be described.

According to a first embodiment, which is the embodiment of FIGS. 1 and 2, the switch from the rigid state to the soft state, and vice versa, occurs "naturally", that is to say with no mechanical control member or electronic slaving, by virtue of the pressure of the oil in the chamber 19. To this end, the volume of the oil supply ducts 20 and that of the chamber 19, and the stiffness of the spring 13 in particular are engineered so that that the pressure of the oil in the chamber 19 exceeds the stress of the spring 13, so as to release the piston 12 for the squirrel cage 5 and thus place the latter in the soft state, in the region of uncertainty "I" here situated at around 9800 revolutions per minute, and vice versa. This is possible because, as the engine speed increases, the centrifugal force forces the oil increasingly strongly radially outwards, and therefore towards the chamber 19. The engineering of the various components makes it possible to ensure that the oil pressure crosses the threshold of the stress of the spring 13 in the area of uncertainty "I", the oil pressure being dependent on engine speed. Thus, the stiffness of the squirrel cage 5 naturally tunes itself to the speed of the turbine engine, with no intervention on the part of the pilot of the aircraft or electronic slaving.

According to a second embodiment, a mechanical device may be arranged in such a way as to send a greater or lesser flow rate of oil into the chamber 19, according to the engine speed. This mechanical device may be controlled manually by the pilot who operates it according to the engine speed, or may be connected to a slaving device automatically actuating it as a function of engine speed.

According to a third embodiment, there is not necessarily any oil retaining chamber 19 under the piston 12 and a mechanical device for actuating the actuator 11 is provided in order to change the state of stiffness of the squirrel cage 5 according to the engine speed, by actuating the piston 12 in the upstream or downstream direction. This device may either be controlled manually by the pilot of the aircraft according to the engine speed or may be connected to a slaving device automatically actuating it as a function of engine speed.

By virtue of the invention, during the various phases of turbine engine speed, whatever the embodiment chosen, the state of stiffness of the squirrel cage 5 with respect to the low-pressure shaft is tuned so that the response of the bearing 3 always lies on the curve shown in dotted line in FIG. 5, namely the curve for which the loads borne by the bearing 3 are minimal, except in the area of uncertainty "I" as seen above. Thus, the loads borne by the bearing 3 are tuned to the engine speed by a change in the behaviour of its frequency response, in this instance by changing curves in the diagram of FIG. 5. Typically, in the phases during which the aircraft is on the ground, whether this is at idling speed or as it moves along, the engine speed is below 9800 revolutions per minute and the squirrel cage 5 is kept in the rigid state, with the piston 12 bearing against its frustoconical bearing surface 10 in order to render the entity rigid through a wedging effect, whereas during the phase of take-off then the phases of cruising flight, the squirrel cage 5 is left in the soft state, out of contact with the piston 12, the oil exerting pressure on the latter, in the chamber 19, to keep it in abutment against the shoulder 14' of the spacer piece 14.

It may be noted, from FIG. 5, that beyond the threshold currently required, of 15 250 revolutions per minute as quoted earlier, if the squirrel cage 5 is in the soft state, the stresses on the shaft of the bearing 3 are low. It then follows that, by virtue of the invention, it is possible if necessary to increase the maximum threshold for turbine engine speed without the response of the bearing 3 to vibrational excitation becoming a prohibitive factor.

The prior art proposes damping devices using oil to damp the shaft bearings, this commonly being known as "squeeze" by those skilled in the art because the oil is compressed or squeezed in order to perform its damping function. Such a device may be provided, and this is depicted schematically by the references 23, 23' in FIGS. 1 and 2. In this instance, we have two circumferential grooves provided on the low-pressure shaft 1, in which grooves two ribs of the squirrel cage 5 are inserted; oil is provided between the ribs and the grooves, and is compressed or squeezed according to the engine speed and the vibrational excitations and thus performs a damping function. This oil-damping device makes it possible to attenuate the frequency response to the excitations of the bearing 3. It is not needed here, in as much as the responses to the excitations are minimized in other ways by virtue of the tuning of the stiffness of the squirrel cage 5, but its action may, on the one hand, be combined with that of the squirrel cage 5 and, on the other hand, prove effective in the event of failure of the device that changes the state of the cage 5.

The invention has been described in conjunction with an inter-shaft bearing between a low-pressure turbine shaft and a high-pressure turbine shaft, but it goes without saying that it applies to any shaft supported by a bearing, it being possible for the bearing to be fixed, at its opposite race secured to the means of connection to the shaft having a variable stiffness, in this instance the race secured to the squirrel cage, to any other rotary shaft or to a fixed structure of the engine.

In the remainder of the description, for reasons of convenience, we shall speak about the squirrel cage, but this of course relates more generally to means of variable stiffness, the squirrel cage corresponding to their preferred embodiment.

In the event, for example, that the bearing via its internal race supports a rotary shaft and is fixed by its external race to a bearing support component secured to the fixed structure of the turbine engine, the choice of the stiffness of the squirrel cage as a function of engine speed may be made in a similar way, by analysing the various resonant frequencies liable to occur as a function of the rotational speed of the shaft. In the embodiment studied before, where the squirrel cage was secured to the low-pressure turbine shaft, the loads with respect to which the frequency response curves of the bearing were calculated corresponded to imbalance of the high-pressure turbine shaft, which was therefore situated on the other side of the bearing with respect to the squirrel cage. If the bearing is fixed by its external race to a bearing support connected to the fixed structure, the squirrel cage is secured to the shaft experiencing the imbalance. The physical behaviour of the whole is therefore different but, in this case, it turns out that the analysis of the frequency responses of the bearing also demonstrates a resonant frequency at low speed in the soft configuration of the squirrel cage, the rigid configuration of the squirrel cage exhibiting a resonant frequency at higher speed. In consequence, the device can be arranged in such a way that the squirrel cage is in a rigid position at low speed and in a soft configuration at higher speed. Actuation of the actuator is then altered accordingly.

Whatever the case, depending on the nature of the shaft to which the squirrel cage is attached, the frequency response of the bearing is analysed and the squirrel cage actuated in such a way as always to be in the state of stiffness corresponding, according to the various engine speeds, to the curve whose response to a load is the lowest, except possibly in the area of uncertainty in which the change of curve takes place, the differences in load in this area in any case not being very significant.

Furthermore, the invention has been described in conjunction with a bearing comprising an internal race attached to the squirrel cage and an external race attached a rotary shaft or, as has just been seen, to a fixed structure of the engine, between which races there extend rolling bodies, but it goes without saying that the rolling bodies could extend directly, for example, between two grooves, one in the squirrel cage 5 and the other in the rotary shaft or the fixed structure. It could also be any other type of bearing, an oil bearing or a gas bearing in particular. In all cases, the bearing extends between a shaft or structure that is fixed and the element of tuneable stiffness, which in this instance is the squirrel cage, the relative rotational movements of one with respect to the other of which it permits.

The actuator for its part may exhibit symmetry of revolution or may consist of a plurality of actuators distributed about the periphery of the shaft; in the latter case, there would be a plurality of oil retaining chambers. In this instance it is preferable to use an annular piston, forming an annular oil retaining chamber, with a frustoconical portion intended to butt against or not butt against the annular bearing surface of the squirrel cage, first by one or more springs distributed about the circumference of the shaft.

Finally, it would be possible to provide more than two different levels of stiffness by using several connecting elements connecting the shaft and the bearing, or by using a single element suitably arranged.

The invention claimed is:

1. Rotary engine comprising at least one shaft mounted to rotate with respect to another element of the engine, fixed or rotary, to which it is connected by at least one bearing, it being possible for the engine to operate in at least two different operating speeds, the shaft comprising means of connection to the bearing that have a state of stiffness that can vary with the engine operating speed, characterized in that the connecting means comprise a squirrel cage comprising at least two points of attachment, on the one hand to the bearing and, on the other hand, to the shaft, between which points there extends a portion that is flexible in bending, the shaft comprises an actuator able to adopt at least two positions for controlling the state of stiffness of the squirrel cage, the actuator comprises a piston designed to be displaced, against the action of return means, by a pressure of oil in a chamber formed between the piston and the shaft from a rigid state of stiffness position to a soft state of stiffness position, and vice versa.

2. Rotary engine according to claim 1, in which the actuator can adopt a first position, out of contact with the squirrel cage, in which position the squirrel cage is in a soft state of stiffness, and a second position, in abutment between a wall of the shaft and a wall of the squirrel cage, in which position the squirrel cage is in a rigid state of stiffness.

3. Rotary engine according to claim 1, in which the stiffness of the connecting means varies automatically with the engine speed.

4. Rotary engine according to claim 3, in which the oil pressure is controlled by the engine speed, by centrifugal force.

5. Engine according to claim 4, in which the oil pressure in the chamber varies with the centrifugal force exerted by the rotation of the shaft of the engine.

6. Rotary engine according to claim 1, which is a twin spool turbine engine in which the shaft is the low-pressure turbine shaft and the other element of the engine is the high-pressure turbine shaft.

7. Rotary engine shaft comprising means of connection to a bearing having a state of stiffness that can vary with the operating speed of the engine, characterized in that the connecting means comprise a squirrel cage comprising at least two points of attachment, on the one hand to the bearing and, on the other hand, to the shaft, between which points there extends a portion that is flexible in bending, the shaft comprises an actuator able to adopt at least two positions for controlling the state of stiffness of the squirrel cage, the actuator comprises a piston designed to be displaced, against the action of return means, by a pressure of oil in a chamber formed between the piston and the shaft from a rigid state of stiffness position to a soft state of stiffness position, and vice versa.

8. Shaft according to claim 7, in which the actuator can adopt a first position, out of contact with the squirrel cage, in which position the squirrel cage is in a soft state of stiffness, and a second position, in abutment between a wall of the shaft and a wall of the squirrel cage, in which position the squirrel cage is in a rigid state of stiffness.

9. Shaft according to claim 8, which is a low-pressure turbine shaft of a twin spool turbine engine.

10. Connecting means between a shaft of a rotary engine and a bearing connected to the shaft, which have a state of stiffness that can vary with the operating speed of the engine, and which are characterized in that they comprise a squirrel cage comprising at least two points of attachment, intended to be attached on the one hand to the bearing and, on the other hand, to the shaft, between which points there extends a portion that is flexible in bending and an actuator able to adopt at least two positions for controlling the state of stiffness of the squirrel cage, the actuator comprising a piston designed to be displaced, against the action of return means, by a pressure of oil in a chamber formed between the piston and the shaft from a rigid state of stiffness position to a soft state of stiffness position, and vice versa.

11. Connecting means according to claim 10, in which the actuator can adopt a first position, out of contact with the squirrel cage, in which position the squirrel cage is in a soft state of stiffness, and a second position, in abutment between a wall of the shaft and a wall of the squirrel cage, in which position the squirrel cage is in a rigid state of stiffness.

12. Connecting means according to claim 10, forming means of connection between the low-pressure turbine shaft and the inter-shaft bearing between the low-pressure turbine shaft and the high-pressure turbine shaft of a twin spool turbine engine.

* * * * *